United States Patent [19]

Ochocki

[11] Patent Number: 5,175,031

[45] Date of Patent: *Dec. 29, 1992

[54] LAMINATED SHEETS FOR MICROWAVE HEATING

[75] Inventor: Michael J. Ochocki, Elk River, Minn.

[73] Assignee: Golden Valley Microwave Foods, Inc., Edina, Minn.

[*] Notice: The portion of the term of this patent subsequent to Nov. 13, 2007 has been disclaimed.

[21] Appl. No.: 511,840

[22] Filed: Apr. 20, 1990

Related U.S. Application Data

[63] Continuation of Ser. No. 261,380, Oct. 24, 1988, abandoned.

[51] Int. Cl.⁵ ............................................. H05R 6/64
[52] U.S. Cl. ............................. 428/34.2; 219/10.55 E; 426/107; 426/113; 426/234; 426/243; 428/323; 428/328; 428/329; 428/511; 428/537.7
[58] Field of Search .............. 428/35.3, 34.2, 328, 428/329, 323, 486, 511, 408; 426/107, 113, 126, 234; 219/10.55 E

[56] References Cited

U.S. PATENT DOCUMENTS

| | | | |
|---|---|---|---|
| 4,156,806 | 5/1979 | Teich | 219/10.55 E |
| 4,190,757 | 2/1980 | Turpin et al. | 426/107 |
| 4,264,668 | 4/1981 | Balla | 428/195 |
| 4,283,427 | 8/1981 | Winters | 426/107 |
| 4,518,651 | 5/1985 | Wolfe, Jr. | 428/308.8 |
| 4,602,141 | 7/1986 | Nalte | 219/10.55 E |
| 4,640,838 | 2/1987 | Isakson et al. | 426/107 |
| 4,713,510 | 12/1987 | Quick et al. | 219/10.55 E |
| 4,806,718 | 2/1989 | Seaborne | 219/10.55 X |
| 4,808,780 | 2/1989 | Seaborne | 219/10.55 E |
| 4,810,845 | 3/1989 | Seaborne | 219/10.55 E |
| 4,818,831 | 4/1989 | Seaborne | 219/10.55 E |
| 4,864,089 | 9/1989 | Tighe et al. | 219/10.55 E |
| 4,865,921 | 9/1989 | Hollenberl et al. | 428/461 |
| 4,876,423 | 10/1989 | Tighe et al. | 219/10.55 E |
| 4,876,427 | 10/1989 | Mode | 219/10.55 E |
| 4,878,765 | 11/1989 | Watkins et al. | 383/116 |
| 4,883,936 | 11/1989 | Maynard et al. | 219/10.55 E |
| 4,904,836 | 2/1990 | Turpin et al. | 219/10.55 E |
| 4,914,266 | 4/1990 | Parks | 219/10.55 E |
| 4,915,780 | 4/1990 | Beckett | 156/661.1 |
| 4,917,748 | 4/1990 | Harrison | 156/230 |
| 4,943,456 | 7/1990 | Pollart et al. | 428/34.3 |
| 4,959,120 | 9/1990 | Wilson | 156/651 |
| 4,970,358 | 11/1990 | Brandberg et al. | 219/10.55 E |
| 4,982,064 | 1/1991 | Hartman et al. | 219/10.55 E |
| 5,002,826 | 3/1991 | Pollart et al. | 428/323 |
| 5,038,009 | 8/1991 | Babbitt | 219/10.55 E |
| 5,059,279 | 10/1991 | Wilson | 156/651 |

FOREIGN PATENT DOCUMENTS 0276654 8/1988 European Pat. Off. .
2166554 8/1973 France .

OTHER PUBLICATIONS

Pending Patent Application Ser. No. 601451 Filed Oct. 19, 1990 Thermocompensating Susceptor.

*Primary Examiner*—George F. Lesmes
*Assistant Examiner*—Christopher Brown
*Attorney, Agent, or Firm*—James V. Harmon

[57] ABSTRACT

A coated laminate is described comprising a microwave transparent supporting sheet or substrate such as paper, paperboard or plastic upon which is printed a susceptor lamina comprising a cured dispersion of an organic printing ink vehicle matrix in which is uniformly suspended at least two kinds of dispersed particles, one of which is an electrically conductive microwave interactive carbon particle and the other of which is an electrically nonconductive suspended mineral attenuator particle for dissipating, spreading and modulating the energy received by the conductive particles. Of the two kinds of suspended particles, only the carbon particles interact with microwave energy directly. Both types of suspended particles remain dispersed in the ink vehicle until printed and cured. The printed lamina can include areas of solid coverage surrounded by peripheral areas of decreased coverage which include small open areas, i.e. unprinted openings, with larger size unprinted openings provided proceeding toward the periphery of the susceptor lamina.

14 Claims, 2 Drawing Sheets

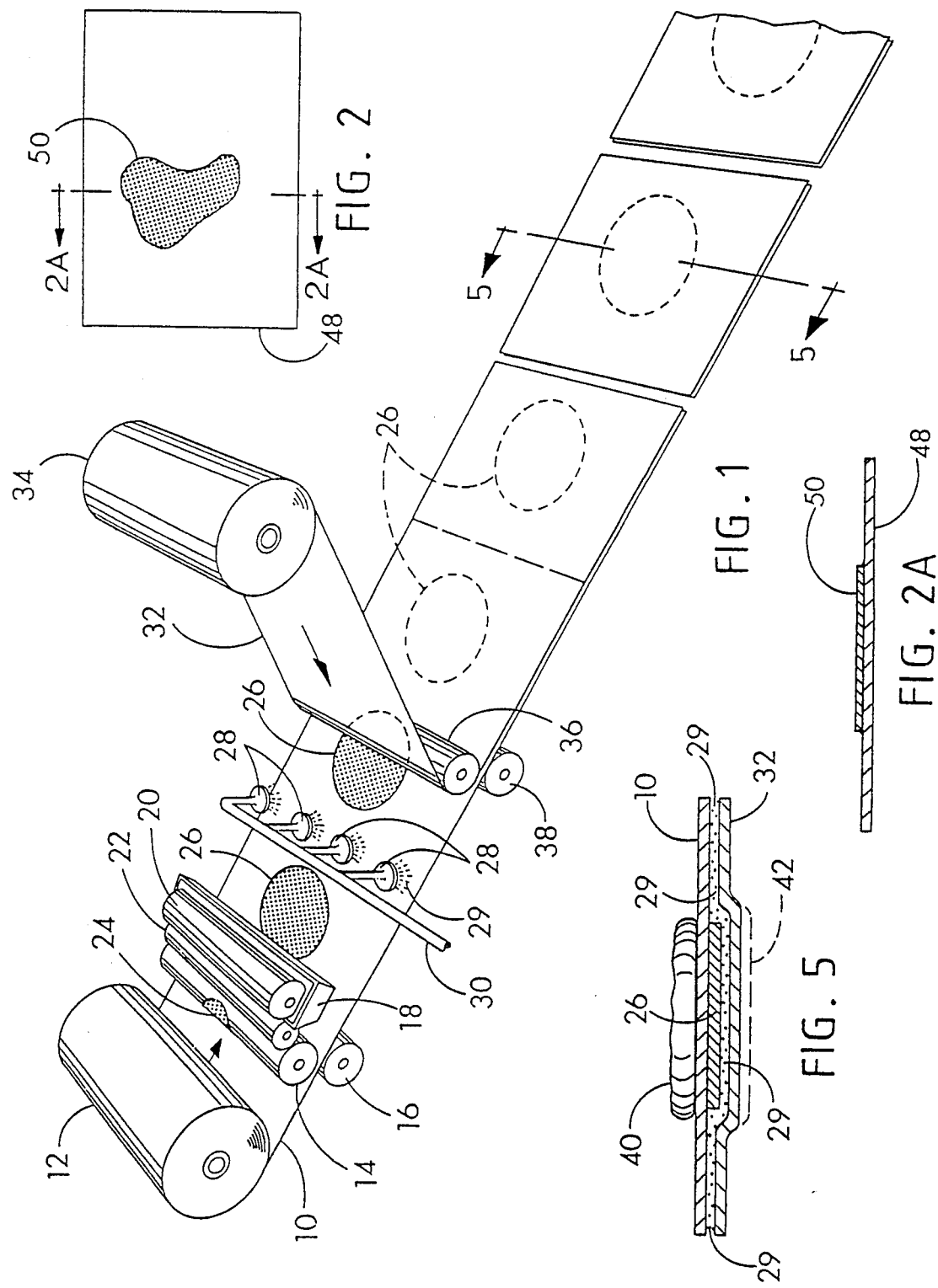

LAMINATED SHEETS FOR MICROWAVE HEATING

This is a continuation of application Ser. No. 261,380, filed Oct. 24, 1988, now abandoned.

FIELD OF THE INVENTION

The present invention relates to laminated sheets, especially paper and paperboard sheets which convert microwave energy to heat for warming products in a microwave oven.

BACKGROUND OF THE INVENTION

Foods such as popcorn, pizza that can be heated and, in the case of popcorn, popped quickly in the microwave oven have achieved an astounding degree of popularity in recent months. It is only necessary to place the package in the microwave oven for three or four minutes to obtain a piping hot bag of freshly popped popcorn or a serving of pizza.

Many commercially available heating packages contain a heater or susceptor formed from a thin sheet of a plastic resin such as a polyester film vapor-coated with a semiconductive layer, e.g. aluminum. The coated film is usually bonded to a support such as paper or paperboard. These susceptors require several components and extra processing steps which adds to the complexity and cost of production. Vapor coating and laminating the plastic sheet to the paper or paperboard backing makes the composite structure relatively expensive and requires a substantial investment in processing equipment.

It has also been proposed to coat a paper support sheet with a carbon-containing ink. For example, U.S. Pat. No. 4,518,651 describes the coating of 18-point board with carbon black suspended in a matrix of a polyester copolymer dissolved in an organic solvent to which is pressed a polyester film under a pressure of 1,250 psi for three minutes. All samples required the application of a substantial amount of pressure in order to be an effective heater U.S. Pat. No. 4,264,668 describes the use of a carbon strip for sealing bags. Carbon particles in the form of powdered coal or carbon black are mixed with a binder such as an acrylate-type binder. Several layers are printed one on top of the other in order to obtain an appropriate resistivity of approximately 6,000 ohms. The carbon black layer is used to seal polyethylene plastic to form two narrow sealed bands when held against a sealing device, e.g. a high frequency transformer that produces a high frequency electric field. The coated sheets are not used for heating in a microwave oven. Once the finished package is formed, no further heating occurs. Moreover, the carbon strips on the edge of the bag are not located appropriately to heat the contents of the package.

The carbon ink formulas described in the foregoing patents were tried but they did not provide uniform heating. Heating was usually accompanied by scorching, popping, arcing and burning. Moreover, the use of high pressure to form a product is unacceptable.

It was found, for example, that when carbon was used alone with a standard ink vehicle burning and uncontrolled temperature rise would occur with a likelihood of burning the package and the product being heated. It was also found that when carbon was mixed with an acrylic vehicle the resulting susceptor would burn up a package in about one minute. The package would start to brown at about 400° F and quickly thereafter burn which is, of course, unacceptable. Once the package begins to carbonize, this facilitates further heating and accelerates the burning reaction which causes burning to occur at a faster rate. This can be referred to as runaway heating.

An important objective of the invention is to provide a microwave susceptor coating applied at normal pressure as an ink which, upon exposure to microwave heating, will produce a uniform heat without unacceptable arcing, popping, sparking or burning. It is another objective to obtain uniformity of heating in different portions of the package and also from one sample to another. The heating composition must be able to be coated, preferably by means of a conventional printing press directly onto a backing such as paper, paperboard or the like without the requirement for multiple superimposed printed coatings, plastic sheets or high pressure which increase production costs and capital requirements.

To be useful the susceptor composition must have all the qualities of a good printing ink including the proper rheological properties: viscosity, dilatency and thixotropy to avoid problems such as misting, splattering or dripping from freshly printed surfaces moving at high speed and must also transfer easily from the supply roll to the printing roll. While the compositions suited for the present invention can be printed by means of a variety of printing processes such as offset, intaglio, letterpress and the like, it is particularly desirable for the composition to be applied by flexography or gravure printing. The microwave interactive heating composition, which for convenience will hereinafter sometimes be referred to as ink, must also have other desirable ink qualities such as good film strength, rub resistance, flexibility, the ability to dry quickly, and should be nontoxic both in the pressroom and as a finished coating. It should also have good covering characteristics and be sufficiently stable to resist settling or other degradation during use. It should produce coatings of uniform thicknesses and be able to form a continuous or interrupted coating, e.g. a coating with a multiplicity of openings or uncoated spots within a coated area.

SUMMARY OF THE INVENTION

In one form of the present invention a laminate is provided for microwave heating of packaged products that are to be heated in a microwave oven which preferably includes at least two supporting sheets of dielectric material. The dielectric material is typically paper, paperboard or plastic film. One of the dielectric sheets serves as a susceptor substrate. A microwave susceptor composed of an ink layer containing a microwave inductive substance is printed onto one of the sheets over a selected portion of its surface in alignment with the packaged product to be heated. The sheets are joined together in face-to-face relationship with the ink layer located between the sheets to thereby provide a bilayer laminate of dielectric material as a support structure for the ink layer which has insufficient strength to be self-supporting. During operation heat is transferred to the product, e.g. a food product being heated, usually by conduction through one of the sheets which serves as a structural support for the layer of ink. The invention is also useful as a single sheet to which the ink layer has been applied.

The present invention also provides a coated and/or laminated sheet material such as paper or paperboard that is transparent to microwave energy and has a printed susceptor layer or coating thereon. The susceptor coating comprises a dispersion of a fluid organic printing ink vehicle base in which is uniformly and homogenously suspended two kinds of dispersed particles, one of which is electrically conductive microwave interactive carbon particles and the other of which is electrically nonconductive non-microwave interactive mineral attenuator particles for dissipating, spreading and/or modulating the energy absorbed and converted to heat by the conductive particles. Thus the dispersed phase comprises two kinds of uniformly intermixed suspended particles of different compositions. Only the carbon interacts with microwave energy directly. Both suspended materials are composed of microscopic size particles that remain dispersed or in suspension in the ink vehicle until used. It is important that both kinds of particles are dispersed in the same vehicle rather than, for example, layered one on top of the other to achieve the desired results. While the precise method of interaction is not known with certainty it is speculated that the suspended attenuation particles prevent localized energy buildup and consequent runaway heating. They may also prevent agglutination of the carbon particles to thereby provide a more uniform dispersion and more uniform heating characteristics.

THE FIGURES

FIG. 1 is a perspective view showing sheet material being printed and laminated in accordance with one form of the invention.

FIG. 2 is a plan view of a sheet printed in accordance with another form of the invention.

FIG. 2A is a cross-sectional view taken on line 2A—2A of FIG. 2.

FIG. 5 is a transverse cross-sectional view taken on line 5—5 of FIG. 1 with the thickness of the layers exaggerated for clarity of illustration.

DETAILED DESCRIPTION OF THE INVENTION

Figure 3:
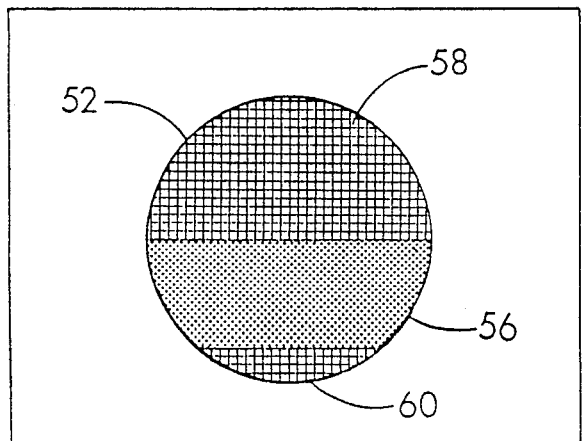
FIG. 3 is a plan view of a sheet printed in accordance with another form of the invention.

In accordance with the present invention a printed or coated sheet is provided which consists of a sheet of paper, paperboard, plastic film or other flexible microwave transparent sheet material in which the sheet is printed with a special printing ink adapted to produce heat when exposed to microwave energy in a microwave oven. The substrate or backing sheet material can, for example, be 15 to 50-pound kraft paper or paperboard such as 18 or 20 point paperboard, plastic film such as 3 mil polyester, nylon, cellophane or the like. The special printed coating comprises a microwave susceptor composed of a fluid organic and resinous printing ink vehicle or film former that serves as a base or matrix to hold the ink together and to the underlying substrate. The vehicle can comprise any suitable ink vehicle such as an acrylic or maleic resin, e.g. maleic rosin ester, polyvinyl acetate, protein or soluble shellac. The solvent can be water with or without an amine such as ammonia. A variety of other spirit based ink vehicles known to the art can also be used; however, water based inks are preferred. Suitable water based inks can be alkaline solutions of acidic resins. Upon drying the resins become water insoluble by evaporation of ammonia or other volatile amines. The properties depend upon the type of acidic resin used. Many suitable carboxylated or acid-containing resins can be used. Four general types of ammonia soluble resins can be employed including acrylic, protein, shellac and maleic resins. The best heat resistance is provided by acrylic and protein resins, and the best printability and drying is provided by acrylic resins. The shelf life and dispersion ability are also better with acrylic resins and accordingly, an acrylic resin vehicle is preferred but is not essential.

As the ink dries the acrylic particles present in the emulsion coagulate or flow together to form a film.

The ink vehicle typically contains about 30% resin solids and about 70% water. The ink vehicle when it consists of an acrylic resin can be present in the amount of about 50% to 80% by weight, typically about 65% to 70% by weight.

Uniformly and homogenously suspended in the vehicle which serves as a matrix or binder are at least two kinds of dispersed particles. The first is an electrically conductive particle comprising carbon optionally together with suspended metal particles such as aluminum flakes in a minor amount, say 0% to 20% of the electrically conductive particles.

The conductive carbon particles dispersed in the vehicle should be of a suitable ink-grade carbon black such as channel black, furnace black or lamp black. While various suitable carbon blacks can be used, one suitable carbon black is 90F Black (Inmont Printing Inks Division of BASF Corporation, Chicago, Ill. [I.P.I.]). Approximately one part of carbon black is present for each four or five parts of film former (wet basis).

Also dispersed in the vehicle and uniformly and homogenously intermixed with the electrically conductive particles are particles of an electrically nonconductive microwave non-interactive inorganic attenuator for dissipating, spreading out or modulating the energy received by the conductive particles. The attenuator particles can comprise any of a variety of nonconductive mineral powders of fine particle size suited for dispersion in an ink vehicle. Among such attenuators are powdered titanium dioxide, clay, zinc oxide, calcium carbonate, sodium silicate, barium sulfate, aluminum oxide or aluminum sulfate, and for nonfood items, antimony oxide, white lead or the like. These attenuators can be used in an amount preferably from about two-thirds to about six times the amount of carbon black present. The attenuator is present in a sufficient amount to prevent localized overheating, sparking and burning. It appears to modulate the action of the carbon black and is thought to render the dispersion of the carbon black more uniform and to provide less opportunity for carbon particles agglutination. In addition, the presence of the attenuator between the carbon black particles will tend to produce electron tunneling as a result of the fluctuating electrical field produced by the microwave energy and will reduce the bulk resistivity.

Both kinds of suspended particles are preferably dispersed in the fluid ink vehicle conventionally as by means of a ball mill, rod mill or roller mill until uniform dispersion is obtained as will be understood by those skilled in the printing art. Only enough of the attenuator needs to be provided to reduce the tendency for hot spots to occur in the finished susceptor target. If too much is present the heating effect will be reduced, but if too little is present, sparking or hot spots may appear. While the particle size is not considered critical, carbon particles and attenuator particles having a particle size on the order of about 10 to about 1,000 nanometers is typical. Other electrically conductive particles such as metal particles, e.g. flakes of aluminum, bronze or nickel, can also be used in a minor amount with the carbon particles.

Minor amounts of known ink additives can be provided for improving flow and drying properties as well as the properties of the finished ink film. An amine such as ammonia or an organic amine of any suitable known composition useful in printing inks can be employed to form a stable vehicle suspension. Suitable amines include any of a variety of organic amine compounds characterized by reacting with the acid group of the resin present. The organic amines are slower evaporating than the ammonia sometimes used; consequently, their presence retards the drying time to some degree. One suitable amine is morphaline (I.P.I.) in the amount of about 0% to 3% by weight. As a plasticizer and emulsifier, proplyene glycol can also be used in an amount from about 0% to 5%. A small amount of wax such as polyethylene wax or other suitable known composition can also be employed as an agent for promoting transfer and to give the finished ink film desired characteristics. Polyethylene wax can be used in an amount of from about 0% to 10%.

The invention will be better understood by reference to the figures which illustrate the invention by way of example, of which many variations will be apparent to those skilled in the art.

As shown in FIG. 1, a web 10 is unwound from supply roll 12, from left to right in the drawings, between a printing roll 14 and backing roll 16. Ink present in supply pan 18 is fed from pickup roll 20 to transfer roll 22 and then to printing roll 14. The printing rolls 14-22 merely illustrate dragrammatrcally the printing process since any of a variety of methods can be used including letterpress, gravure, flexographic, planographic, intaglio and others. Of these methods, flexographic and gravure printing are preferred. It will be seen that the ink carried in the supply pan 18 is transferred at 24 as a circular area in this case on the printing roll 14 and from there is transferred to the paper to provide a circular or target-shaped printed susceptor 26. The ink film 26 is then dried conventionally as by means of infrared and/or hot air dryers (not shown) or other suitable drying methods known to the art, and adhesive such as a polyvinyl acetate adhesive is applied in any suitable way as by means of glue application rollers or by means of a sprayer, shown diagrammatically in this case as four spray heads 28 to which glue is supplied under pressure through a supply line 30. The glue can comprise any of a variety of suitable adhesive known to the art. Typical adhesives include polyvinyl acetate emulsion and polyvinyl acetate copolymer emulsion adhesives such as Duracet and Elektromek adhesives by Franklin International and Elektromek Company, respectively.

While the glue supplied by the spray heads 28 is still in a fluid state, a web of paper or other microwave transparent dielectric material, e.g. 30-pound kraft paper 32 is unwound from supply roll 34 and passes between rolls 36 and 38 which laminate the webs 32 and 10 together to form a composite sheet. As shown in FIG. 5, this composite sheet includes a paper sheet 10 in contact with an article to be heated such as a food article 40, the printed susceptor lamina 26, adhesive layer 29 and a second nonconductive sheet 32. If desired, there is also printed onto the sheet 32 in vertical alignment with the printed susceptor 26 an optional layer of heat insulating coating 42. The coating 42 can be a relatively thick clay coating layer which furnishes heat insulating properties for reducing the transmission of heat developed by the susceptor 26 away from the food product 40, thereby rendering the susceptor 26 more efficient in operation so that more of the heat produced is transferred to the food from the susceptor during the heating operation. The clay coating 42 can comprise any suitable commercially available clay coating for paper or a white printing ink with a relatively high load of clay and a compatible white pigment.

When the susceptor 26 is to be used in a package for heating microwave popcorn, the printed susceptor 26 can be a solidly printed disc about 4¼ inches in diameter is printed at a weight of about 1-8 and more typically 4-6 pounds per ream (3,000 square feet). When the susceptor coatings provide a lamina of two pounds per ream, the conductivity is usually between about 2500 and 10,000 ohms per square and most preferably between about 3000 and 5000 ohms per square. It is preferred to apply the ink film as a relatively thin layer by thinning the fluid ink to a fairly fluid consistency, e.g. between about 18 and 22 seconds in a #2 Zahn cup. Since the engraved roll 24 will apply a certain volume of ink per square inch, by providing smaller openings on the surface of the roll a relatively thin ink film can be applied with a carbon content in the dried ink film on the order of 40% to 45%. It will be understood that the viscosity of the fluid ink controls the basis weight of the ink film applied to the paper sheet 10. More or less water or other solvent can be used to control the viscosity. Thus, by adding more water the basis weight can be reduced.

Refer now to FIG. 2 which illustrates another form of the invention. Shown in FIG. 2 is a substrate or backing sheet 48 which is a 20-point food grade paperboard on which is printed a susceptor 50 having an irregular outline shaped to conform exactly to the outline of the food to be placed against it, in this case the shape of a beefsteak. As seen in the cross-sectional view of FIG. 2A, the laminate in this embodiment consists solely of the printed susceptor lamina 50 and the microwave transparent backing sheet 48 that provides integrity and support for the printed susceptor which by itself is not self-supporting. During use, the beefsteak (not shown) is placed on the paperboard sheet 48 adjacent the printed susceptor 50 and in alignment with the edges thereof. The steak can be placed on the opposite side of the board 48 or the printed side, and in that case it is preferably prewrapped in a thin, moisture impervious plastic or paper envelope (not shown).

Refer now to FIG. 3 which illustrates another form of susceptor 52 printed onto a paper support sheet 54. The susceptor 52 in this case comprises a circular disc of about 4¼ inches in diameter composed of solidly printed bar portion 56 and two half-printed grid patterned portions 58 and 60 which comprise approximately 50% open unprinted areas in the form of small unprinted circles or squares surrounded by grid lines. By using this form of the invention a greater amount of heat can be provided by the printed bar 56 precisely where the food is located with reduced amounts being provided at 58 and 60 on either side of the mass of food to supply additional heat but to prevent runaway or excessive heating at the periphery or in areas where the food is likely to come out of contact with the susceptor 52.

Figure 4:
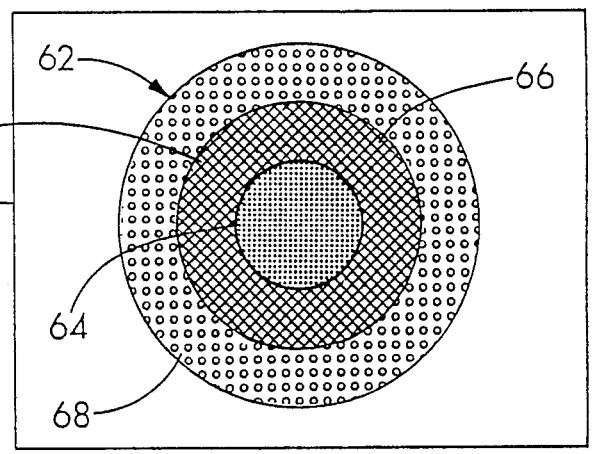
FIG. 4 is similar to FIG. 3 but is printed with a different pattern.

Refer now to FIG. 4 which illustrates a further modified form of the invention which in this case comprises a circular or target-shaped printed susceptor 62 having a solidly printed center section 64, a circular printed grid 66 that is 80% printed and 20% open area. Surrounding that is an additional circular printed area 68 which is approximately 50% printed dots of about diameter and 50% open area. Using the susceptor 62, a greater amount of heat can be provided at the center with reduced amounts provided in successive areas proceeding outwardly toward the periphery by virtue of a reduction in the amount of susceptor material printed onto the substrate. In this way the highest temperatures can be achieved at the center of the product being heated where it is most needed by applying a greater amount, with reduced amounts being provided proceeding outwardly toward the periphery of the susceptor 62. This reduces the likelihood of overheating, particularly where the sheet 70 happens to come out of contact with the product at its edge, such as a food product 40 that is being heated.

Figure 6:
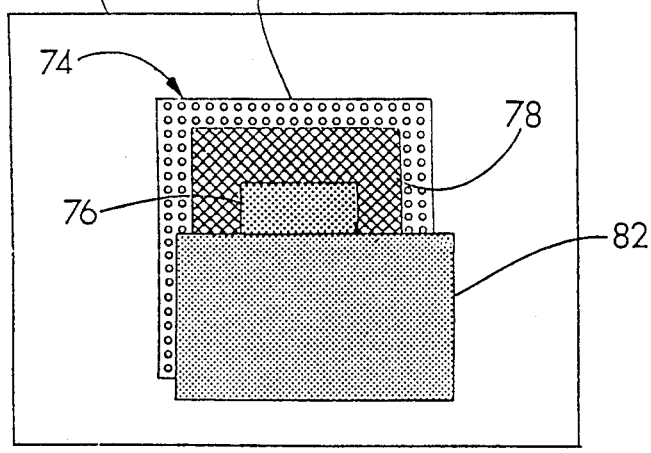
FIG. 6 is a plan view of another form of printed sheet in accordance with the present invention.

Refer now to FIG. 6 which illustrates still another form of the invention. In this case a paper sheet such as 50 pound kraft paper sheet 72 is printed with a susceptor 74 having a square center section 76 that is solidly printed surrounded by a square grid area that is 80% printed and 20% open and an additional peripheral border 80 that is 50% printed and about 50% open. The lower half of susceptor 74 is over-printed with an additional layer of a solidly printed susceptor ink at 82. A greater amount of heating will be provided by the double layer at the bottom with successively reduced amounts of heating provided by the areas 76, 78 and 80. In this way, the amount of heat provided can be tailored to the precise amount of heat required by each portion of the product so that the likelihood of uncontrolled heating is reduced around the periphery of the food product.

The invention will be better understood by reference to the following examples of various ink compositions employed in accordance with the invention. All quantities are expressed on a weight basis. Each example includes the temperature elevation produced by a 4 inch by 5 inch susceptor lamina heating 60 grams of soy oil above the temperature reached after heating the same amount of oil with no susceptor for 90 seconds in a 1,000 watt oven.

EXAMPLE 1

| | Percent |
|---|---|
| Carbon (Furnace Black) | 10 |
| Attenuator (TiO₂) | 15 |
| Film Former (Duracet ®); Franklin International, Columbus, OH) (Polyvinyl Acetate & water, 66% Solid Resin & 44% water) | 75 |
| | 100% |

Water is added to the above listed formula to provide 84% water and 16% solids in the finished ink.
Temperature Increase: 125° F. @ 2 lb/ream

EXAMPLE 2

| | Range | Typical |
|---|---|---|
| Carbon Black (Lampblack) | 2-25 | 14.5 |
| Attenuator (Clay) | 10-15 | 11 |
| Film Former (Acrylic Resin & Water) | 50-80 | 67.5 |
| Emulsifier (Propylene Glycol) | 0-5 | 1 |
| Amine (Morphaline [I.P.I]) | 0-3 | 1 |
| Polyethylene Wax | 0-10 | 5 |
| | | 100% |

Water is added to the above listed formula to provide 84% water and 16% solids in the finished ink.
Temperature Increase: 126° F. @ .55 lb/ream In the finished film the carbon content is 48.3% carbon and 51.7% non-carbon solids (solids basis)

EXAMPLE 3

| | Percent |
|---|---|
| Carbon Black (Graphite) | 11 |
| Zinc Oxide | 25 |
| Film Former (Elektromek ®); Elektromek Company; Carlstad, NJ) (Polyvinyl Acetate copolymer wet basis, 66% Solids Resin and 44% water) | 64 |
| | 100% |

Water is added to the above listed formula to provide 84% water and 16% solids in the finished ink.
Temperature Increase: 201° F. @ 1.65 lb/ream

EXAMPLE 4

| Formulation | Range | Typical |
|---|---|---|
| Carbon Black | 2-25 | 8.4 |
| Clay | 5-7 | 6.4 |
| Yellow | 2-4 | 3.8 |
| Clarion | 6-11 | 9.5 |
| Rubine | 4-6 | 5.7 |
| Polyethylene Wax | 2-3 | 2.9 |
| Slip Compound | .1-.2 | .2 |
| Propylene Glycol | .5-.7 | .6 |
| Defoamer | .1-.2 | .2 |
| Varnish (Maleic resin emulsion in water) | 60-63 | 61.8 |
| Amine (Ammonia) | .5-.7 | .6 |
| % Total Solids | 32-34 | 33.6 |
| % Carbon Black | 21-31 | 25.0 |

Water is added to the above listed formula to provide 84% water and 16% solids in the finished ink.
Temperature Increase: 177° F. @ 4.95 lb/ream

EXAMPLE 5

| Formulation | Range | Typical |
|---|---|---|
| Carbon Black | 2-25 | 8.4 |
| Cyan Blue | 12-20 | 17.0 |
| Clay | 5-7 | 6.4 |
| Alkali Blue | 4-7 | 6.3 |
| Polyethylene Wax | 2-3 | 2.9 |
| Slip Compound | 0-1 | .9 |
| Amine (Ammonia) | .3-.5 | .4 |
| Defoamer | .1-.2 | .2 |
| Propylene Glycol | .5-.7 | .6 |
| Water | .9-2 | 1.3 |
| Varnish (Acrylic resin emulsion in water) | 53-59 | 55.5 |
| % Total Solids | 33-35 | 34.1 |
| % Carbon Black | 21-30 | 24.7 |

Water is added to the above listed formula to provide 84% water and 16% solids in the finished ink.
Temperature Increase: 146° F. @ 4.11 lb/ream

EXAMPLE 6

| Formulation | Range | Typical |
|---|---|---|
| Carbon Black | 2-25 | 8.4 |
| Aluminum Oxide | 5-7 | 6.4 |
| Polyethylene Wax | 2-3 | 2.9 |
| Amine (Ammonia) | .5-.7 | .6 |
| Propylene Glycol | .5-.7 | .6 |
| Polyvinyl Acetate Homopolymer emulsion in water (Duracet ®) | 30-50 | 42 |
| % Total Solids | 38-43 | 40.9 |
| % Carbon Black | 16-26 | 20.6 |

Water is added to the above listed formula to provide 84% water and 16% solids in the finished ink.
Temperature Increase about 128° F. @ 4.44 lb/ream

EXAMPLE 7

-continued

| Formulation | Range | Typical |
| --- | --- | --- |
| Carbon Black | 2-25 | 8.4 |
| Barium Sulfate | 5-7 | 6.4 |
| Wax | 2-3 | 2.9 |
| Amine (Morphaline TM) | .5-.7 | .6 |
| Propylene Glycol | .5-.7 | .6 |
| Polyvinyl Acetate Copolymer | 30-50 | 42 |
| % Total Solids | 37-42 | 40.1 |
| % Carbon Black | 17-27 | 20.9 |

Water is added to the above listed formula to provide 84% water and 16% solids in the finished ink.
Temperature Increase about 115° F. @ 7.87 lb/ream

EXAMPLE 8

| Formulation | Range | Typical |
| --- | --- | --- |
| Carbon Black | 2-25 | 8.4 |
| Diarylide Yellow | 8-14 | 12.5 |
| Zinc Oxide | .8-1.5 | 1.3 |
| Clay (sulfate clay) | 5-7 | 6.4 |
| Wax | 3-4 | 3.7 |
| Amine (ammonia) | .5-.7 | .6 |
| Propylene Glycol | .5-.7 | .6 |
| Shellac dispersion in water | 62-64 | 62.9 |
| Defoamer | .1-.2 | .2 |
| Water | 1-2 | 2.0 |
| Compound | .8-1.5 | 1.3 |
| % Total Solids | 35-39 | 37.8 |
| % Carbon Black | 18-28 | 22.3 |

Water is added to the above listed formula to provide 84% water and 16% solids in the finished ink.
Temperature Increase: 158° F. @ 4.95 lb/ream

EXAMPLE 9

| Formulation | Range | Typical |
| --- | --- | --- |
| Carbon Black | 2-25 | 8.4 |
| Oasis Black | 2-4 | 3.8 |
| Calcium Carbonate | 5-7 | 6.4 |
| Wax | 2-3 | 2.9 |
| Amine | .5-.7 | .6 |
| Propylene Glycol | .5-.7 | .6 |
| Varnish (protein water dispersion) | 74-79 | 77.4 |
| % Total Solids | 30-31 | 30.9 |
| % Carbon Black | 37-42 | 39.5 |

Water is added to the above listed formula to provide 84% water and 16% solids in the finished ink.
Temperature Increase: 176° F. (after 70 seconds) @ 4.84 lb/ream

EXAMPLE 10

| Formulation | Range | Typical |
| --- | --- | --- |
| Carbon Black | 2-25 | 8.4 |
| Metal Powder (aluminum flake 15%, ink vehicle, 85%) | 4-7 | 6.3 |
| Zinc Oxide | 5-7 | 6.9 |
| Wax | 2-3 | 2.9 |
| Amine | .5-.7 | .6 |
| Propylene Glycol | .5-.7 | .6 |
| Varnish (acrylic dispersion in water) | 33.75-47.25 | 39.15 |
| % Total Solids | 29.9-29.94 | 29.916 |
| % Carbon Black | 24.2-33.90 | 28.11 |

Water is added to the above listed formula to provide 84% water and 16% solids in the finished ink.
Temperature Increase: 139° F. @ 2.29 lb/ream

EXAMPLE 11

|  | Percent |
| --- | --- |
| Carbon | 8.7 |
| Clay | 11 |
| Aluminum Sulfate | 11.6 |
| Wax | 5 |
| Morphaline TM | 1 |
| Propylene Glycol | 1 |
| Acrylic Resin dispersion in water (30% water) | 61.7 |

Water is added to the above listed formula to provide 84% water and 16% solids in the finished ink.
Temperature Increase about 110° F.-115° F. @ 4 lb/ream Many variations of the present invention will be apparent to those skilled in the art within the scope of the appended claims once the principles described above are understood.

What is claimed is:

1. A laminate for a food container to hold a food product to be heated in a microwave oven, comprising:
   at least two supporting sheets of combustible dielectric material bonded together to form a laminate, at least one of said sheets serves as a susceptor substrate;
   a layer of a microwave susceptor for producing heat when exposed to microwave energy;
   said susceptor comprising a microwave inductive substance-containing ink layer including carbon particles dispersed in a fluid matrix comprising a dispersion of resinous particles as a binder material in a liquid and said resinous particles are adapted to form an organic film matrix upon drying to support the carbon particles and a microwave non-interactive mineral attenuator, said ink layer is printed onto the surface of one of the sheets and dried in a position for alignment with said food product;
   at least one of the sheets comprising paper or paperboard;
   whereby heat is transferred to the food product from the ink layer by conduction during heating in a microwave oven;
   the microwave inductive substance-containing ink layer is encapsulated between the sheets and heat from the ink layer is transferred by conduction through one of the sheets to the food.

2. The laminate of claim 1 wherein the sheets are paper and said paper sheets are bonded to one another by means of an adhesive layer and the printed-on susceptor is self-bonded to the paper backing sheet.

3. The printed susceptor of claim 1 wherein said ink layer is printed in a pattern with open unprinted areas comprising a selected percentage thereof.

4. The laminate of claim 1 wherein said ink layer includes a dot or grid pattern.

5. The laminate of claim 1 wherein the printed susceptor has a configuration corresponding to the shape of the product being heated.

6. The laminate of claim 1 wherein a layer of an insulating material is imprinted upon a surface of the laminate in alignment with the susceptor and the insulating material is located opposite said food product to be heated to thereby reduce the loss of heat from the susceptor and to maximize the transmission of heat therefrom to the product being heated.

7. The laminate of claim 1 wherein the fluid matrix is a dispersion of said liquid and a member selected from the group consisting of an acrylic resin, a maleic resin, a protein and shellac.

8. The laminate of claim 1 wherein the fluid matrix contains a minor amount of a polyhydric alcohol, a wax and an amine to modify the characteristics of the ink.

9. The laminate of claim 1 wherein said ink layer include suspended metal particles.

10. The laminate of claim 1 wherein the fluid matrix is an organic resin dispersed in water.

11. The laminate of claim 1 wherein the mineral attenuator is at least one of the following: titanium dioxide, clay, zinc oxide, calcium carbonate, barium sulfate, aluminum oxide, and aluminum sulfate.

12. The laminate of claim 1 wherein the other of said sheets comprises a polyester sheet and the microwave inductive substance-containing ink layer is applied to the surface of the polyester sheet.

13. The laminate of claim 1 wherein said laminate is a part of a package for containing said food.

14. The package of claim 1 wherein at least one said sheet of combustible dielectric material comprises at least one member selected from the group consisting of paper, paperboard, a plastic resinous sheet and cellophane.

* * * * *